(12) United States Patent
Okuyama et al.

(10) Patent No.: US 8,764,204 B2
(45) Date of Patent: Jul. 1, 2014

(54) LENS BARREL, CAMERA DEVICE AND LENS HOOD

(75) Inventors: Teppei Okuyama, Tokyo (JP); Akihiko Obama, Tokyo (JP)

(73) Assignee: Nikon Corporation, Tokyo (JP)

(*) Notice: Subject to any disclaimer, the term of this patent is extended or adjusted under 35 U.S.C. 154(b) by 99 days.

(21) Appl. No.: 13/440,209

(22) Filed: Apr. 5, 2012

(65) Prior Publication Data

US 2013/0010377 A1 Jan. 10, 2013

(30) Foreign Application Priority Data

Apr. 8, 2011 (JP) .................................. 2011-086564
Mar. 19, 2012 (JP) .................................. 2012-062551

(51) Int. Cl.
*G02B 7/02* (2006.01)

(52) U.S. Cl.
USPC .......................................................... 359/611

(58) Field of Classification Search
USPC ........... 359/611, 613; 396/534, 535; 348/373, 348/374; 353/97
See application file for complete search history.

(56) References Cited

U.S. PATENT DOCUMENTS

2009/0067830 A1 3/2009 Tamaki et al.

FOREIGN PATENT DOCUMENTS

| JP | 7-325207 | 12/1995 | |
| JP | 07-325207 | * 12/1995 | ............... G02B 5/00 |
| JP | 2003-177293 | 6/2003 | |
| JP | 2010-020181 | 1/2010 | |
| JP | 2010-276841 | 12/2010 | |
| WO | WO2007/123064 A1 | 11/2007 | |

* cited by examiner

*Primary Examiner* — Joseph P Martinez

(57) ABSTRACT

At the inside wall face of the first tube portion 8a of the lens barrel, the shielding grooves 20 having a saw blade shape are formed along the optical axis O, and each shielding groove 20 at least comprises the first inclined face 22 facing the image side, and the second inclined face 24 facing the object side, further the groove widths of the shielding groove 20 is constituted so that they changes in steps or continuously as getting closer to the second lens group 10b from the object side.

14 Claims, 7 Drawing Sheets

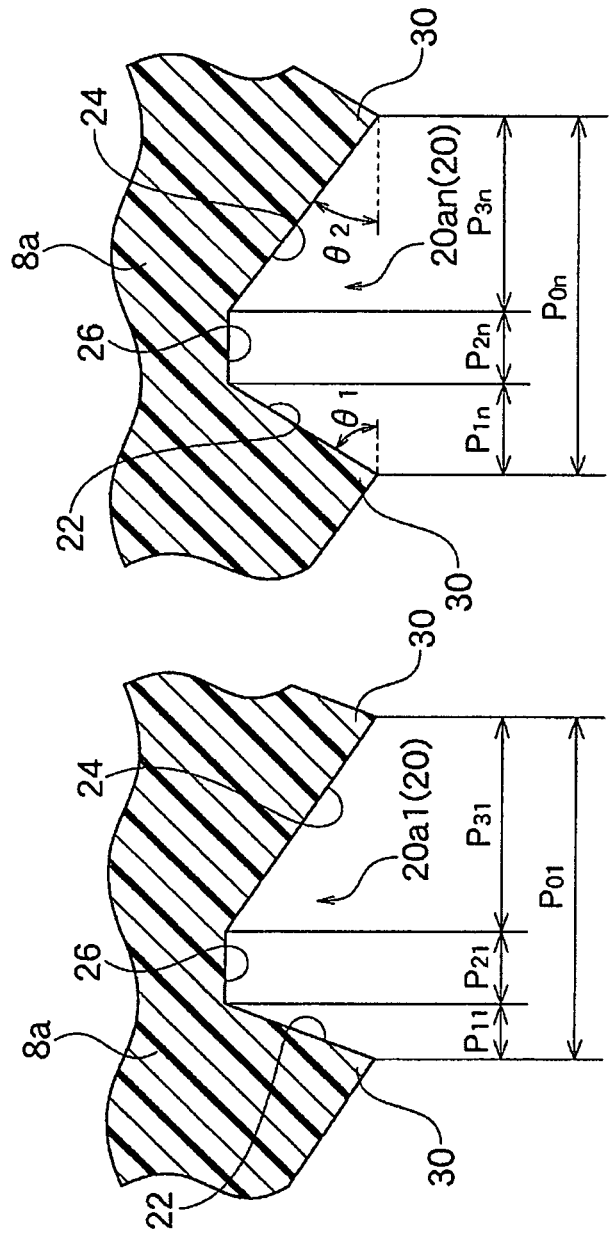

LENS BARREL, CAMERA DEVICE AND LENS HOOD

BACKGROUND OF THE INVENTION

1. Field of the Invention

The present invention relates to a lens barrel, a camera device, and a lens hood.

2. Description of the Related Art

As the structure for preventing or reducing the reflection in the lens barrel used for a optical device such as a camera, an exchange lens for the camera and video camera or so, for example a structure of the lens barrel provided with grooves having V shape at the barrel inner circumferential face, that is the structure of the lens barrel periodically provided with the shielding lines are known (Patent document 1).

However, the conventional lens barrel has groove widths of the shielding grooves being constant regardless of the position of the optical axis inside the lens barrel, and the number of the inside projections formed between the shielding grooves adjacent to each other in the optical axis direction increased, thus it was difficult to suppress the reflection at the peaks of the inside projections thereof.

Note that, in the front and the back of the optical directions of the predetermined lens group in the lens barrel, the lens barrel changing the groove depths of the shielding lines are known (Patent document 2).

However, though the shape of the shielding grooves in the conventional lens barrel is designed to consider the angle of the light ray entering the shielding grooves in the lens barrel; but it does not take into consideration of the light ray towards the imaging device from the shielding grooves, thus the lens barrel having further effective reflection prevention function has been demanded.

PRIOR ART DOCUMENTS

Patent Documents

[Patent document 1]
  Japanese Unexamined Patent Publication No. 2010-20181
[Patent document 2]
  Japanese Unexamined Patent Publication No. 2003-177293

SUMMARY OF THE INVENTION

The present invention was accomplished reflecting such situation, and the object is to provide a lens barrel and a hood which can enhance the reflection prevention effect in the lens barrel and reduce the imaging troubles such as a flair or a ghost in the image, and to provide a camera device including the lens barrel or the hood.

In order to accomplish the above object, the lens barrel of the present invention comprises a lens barrel (8) comprising a first tube portion (8a) which at least part of said first tube portion (8a) is placed at an object side of a lens group (10b), wherein
  at an inner wall side of said first tube portion (8a), plurality of shielding grooves (20, 20a to 20c) having a saw blade shape are formed along a optical axis at the longitudinal cross section including the optical axis of said lens group (10b), and
  groove widths of plurality of said shielding grooves (20, 20a to 20c) change towards said lens group (10b) from said object side along said optical axis (O).

The groove widths of plurality of said shielding grooves (20, 20a to 20c) may be constituted so that it becomes continuously wider towards said lens groups (10b) from said object side along said optical axis (O).

Said shielding grooves (20, 20a to 20c) may comprise a first inclined face (22) facing an image side and a second inclined face (24) facing the object side.

At least a part of said shielding grooves (20, 20a to 20c) may further comprise a parallel face (26) which is approximately parallel in said optical axis and is formed between said first inclined face (22) and said second inclined face (24).

In said shielding grooves (20, 20a to 20c), when a first projection length to said optical axis of said first inclined face (22) is P1, a second projection length to said optical axis of said parallel face (26) is P2, and a third projection length to said optical axis of said second inclined face (24) is P3; then the lens barrel (8) may satisfy the following equation (1). The equation (1) may be satisfied in all of said shielding grooves (20, 20a to 20c).

$$P1+P2<P3 \quad (1)$$

The following equation (2) may be satisfied as well.

$$0.05<P2/(P1+P2+P3)<0.95 \quad (2)$$

The angle of said first inclined face (22) against said optical axis may be made larger at said shielding grooves apart toward said object side from said lens groups (10b), compared to said shielding groove closer to said lens groups (10b).

The angle of said second inclined face against said optical axis is small at said shielding grooves apart toward said object side from said lens group (10b), compared to the shielding grooves closer to said lens group (10b).

At the object side of said lens groups (10b), object side lens groups (10a) are provided, and plurality of said shielding grooves (20, 20a to 20c) formed along said optical axis at inner wall face of said first tube portion (8a) may be positioned between said lens groups (10b) and said object side lens groups (10a).

Said object side lens group (10a) may have positive refractive index and said lens group (10b) may have negative refractive index.

Also, the distance between said lens groups (10b) and said object side lens groups (10a) along said optical axis may be constituted in a changeable manner.

The camera device of the present invention comprises any one of the lens barrel as set forth in above.

A hood according to the present invention is a hood (80) mountable on the object side of the lens barrel (8), wherein
  at an inner wall side of said hood (80), plurality of shielding grooves (20) having a saw blade shape are formed along the optical axis (O) in the longitudinal cross section including the optical axis (O) of said lens barrel (8), and
  pitch spaces of said plurality of shielding grooves (20) are formed and change toward an image side from an object side along said optical axis (O).

The pitch spaces of plurality of said shielding grooves (20) may be formed so that it becomes continuously wider as getting closer to the image side from the object side.

Note that, in the above description, in order to make the present invention explain easier, the numerals of the figure shown in the embodiment were used; however the present invention is not to be limited thereto. The constitution of the embodiment may be modified suitably, and also at least part of the constitution may be substituted as well. Further, the constitutional element without any particular limitation of its position, it can be placed at the position where the function can be exhibited in regardless of the position placed in the disclosed embodiment.

BRIEF DESCRIPTION OF THE DRAWINGS

FIG. 3 is a cross section of the essential parts showing the comparison between the shielding grooves positioned near a first lens group and the shielding grooves positioned near a second lens group.

DESCRIPTION OF THE PREFERRED EMBODIMENTS

Hereinafter the present invention will be described based on the embodiment shown in the figures.

Figure 1:
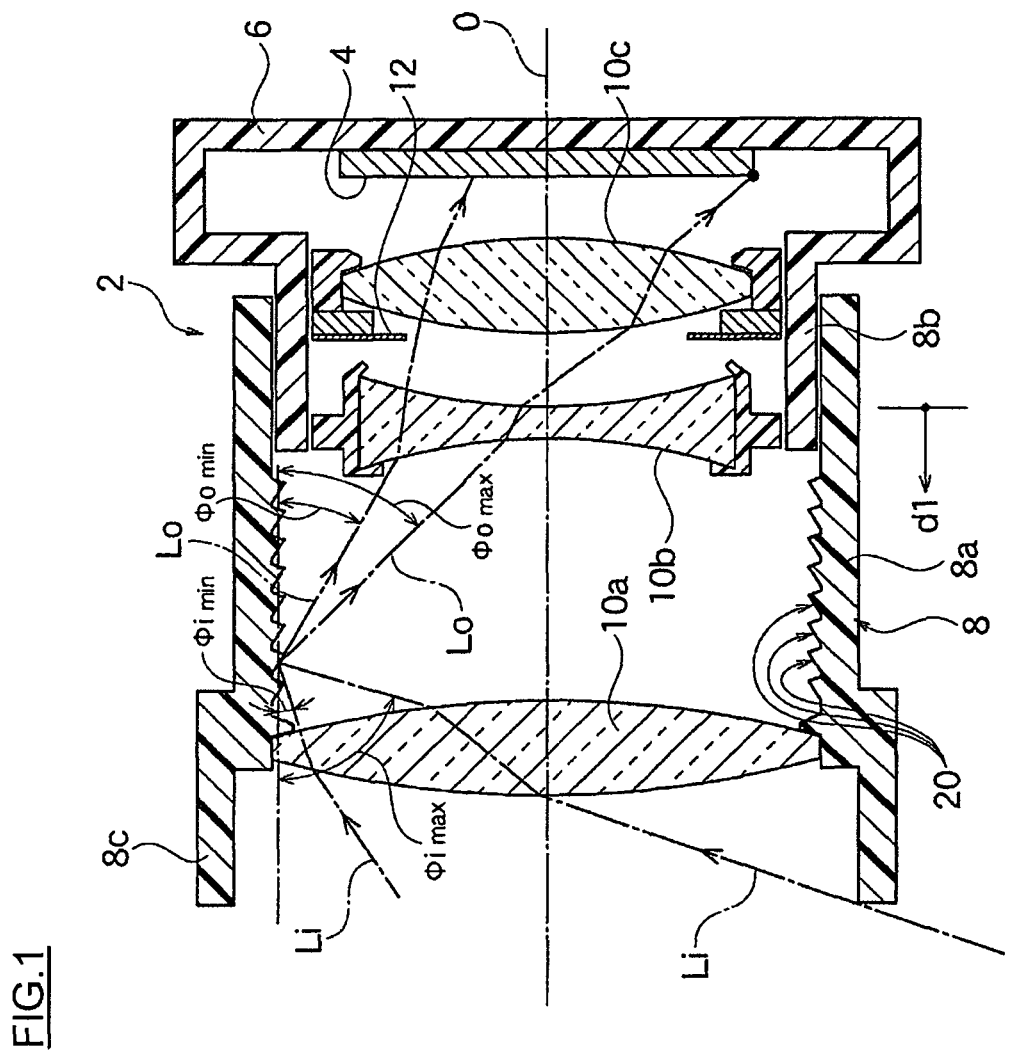
FIG. 1 is a schematic cross section of the camera according to an embodiment of the present invention.

As shown in FIG. 1, the digital still camera 2 according to one embodiment of the present invention may be a single-lens reflex camera capable of changing the lens barrel; however, the present invention will be described as a compact camera in which the lens is made as one body. This camera 2 comprises a camera main body 6 built in with the imaging device 4.

The lens barrel 8 is provided at the camera main body 6. In this embodiment, the lens barrel 8 comprises the first tube portion 8a and the second tube portion 8b, and the second tube portion 8b is fixed against the camera main body 6. The second lens group 10b is provided at the second tube portion 8b. The second lens group 10b constitutes a concave lens (having a negative refractive index) made by a single or plurality of lenses. The second lens group 10b may be mounted inside the second tube portion 8b in a movable manner along the optical axis O thereof or it may be fixed.

At the object side (the photographing object side) along the optical axis (O) direction of the second lens group 10b, the first lens group 10a is provided, and the first lens group 10a is fixed at the inner side of the first tube portion 8a. The first lens group 10a constitutes a convex lens (having a positive refractive index) made by a single or plurality of lenses, and is placed at most object side of the lens barrel 8.

In between the second lens group 10b and the imaging device 4, other lens groups 10c are placed. The other lens groups 10c constitute the convex lens made by single or plurality of lenses in the present embodiment. At the tip 8c of the object side of the lens barrel 8, for example, the hood may be provided, and the photographing object light enters therefrom to form an image on the surface of the imaging device 4 via the first lens group 10a, the second lens group 10b, and the other lens groups 10c. The imaging device 4 is constituted by for example CCD or CMOS or so.

The first tube portion 8a does not necessary have to be a single tube portion, and it may be a combination of plurality of the tube portions. The first tube portion 8 may be for example, the combination of stationary tube, the rotational tube, and the movable tube. The second tube portion 8b also does not necessary have to be a single tube, and may be a combination of plurality of tubes. The first lens group 10a attached to a part of the first tube portion 8a is relatively movable along the optical axis O against the second lens group 10b attached to a part of the second tube portion 8b, and thereby the magnification of the photographing object image imaged to the imaging device 4 is capable to be changed.

In this embodiment, by moving the second lens group 10b and the first lens group 10a along the optical axis O, the camera 2 obtains the zooming function and the focus function. Note that, in between the second lens group 10b and other lens groups 10c, an aperture system 12 is mounted. The aperture system 12 is mounted closer to the other lens groups 10c than second lens group 10b.

At the inner wall face (the inner circumferential face) of the first tube portion 8a positioned between the second lens group 10b and the first lens group 10a, plurality of the shielding grooves 20 having saw blade shape are formed continuously along the optical axis O. Each shielding grooves 20 formed on the inner wall face of the first tube portion 8a along the optical axis O may be separate from each other in a ring shape, or it may be continuous as a spiral shape.

Figure 2:
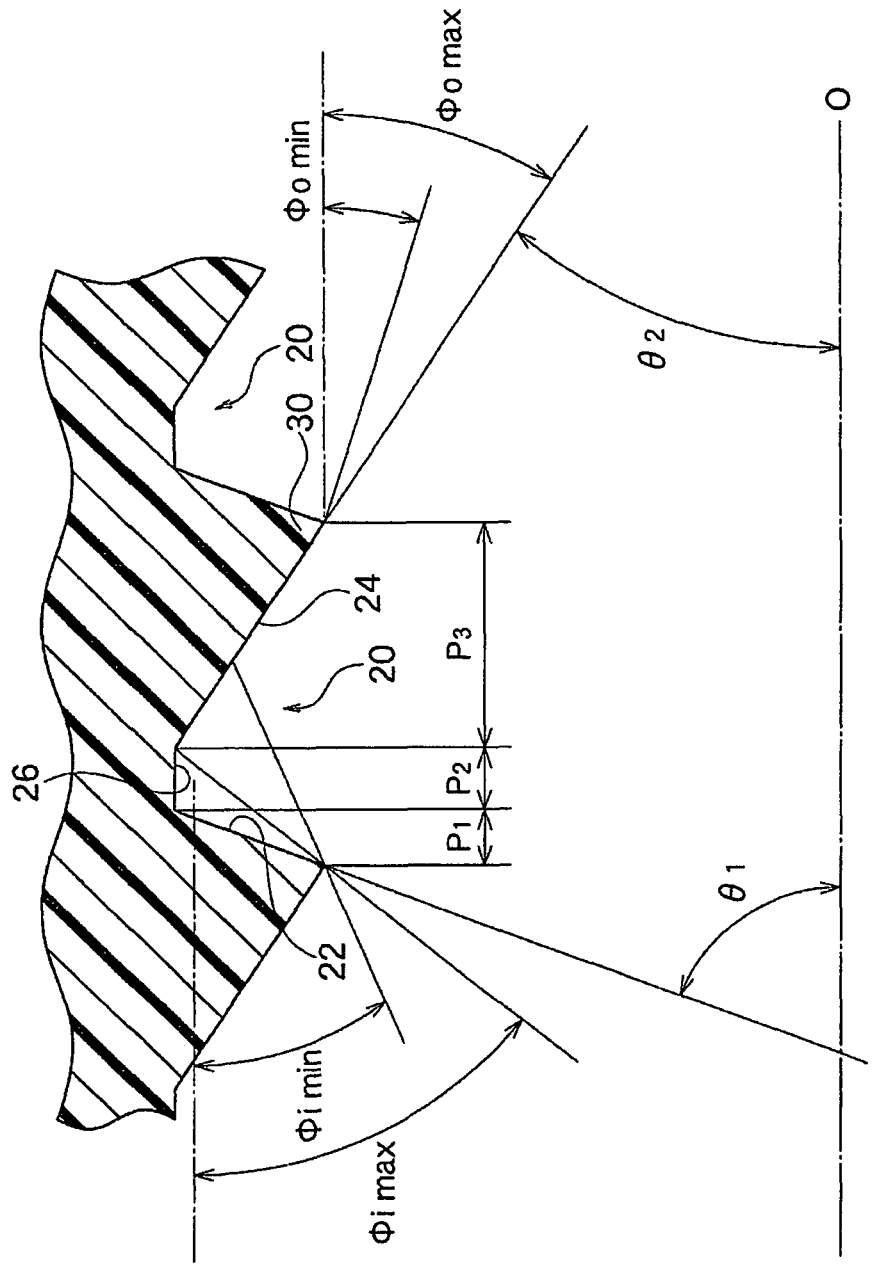
FIG. 2 is a cross section of the essential parts showing the relation between a first inclined face, a second inclined face and a parallel face at each shielding groove formed at an inner wall face of a lens barrel shown in FIG. 1.

As shown in FIG. 2, each shielding grooves 20 comprise the first inclined face 22 facing the image side (the side of the imaging device 4 shown in FIG. 1), the second inclined face 24 facing the object side (the side of the tip portion 8c shown in FIG. 1). In the middle of these first inclined faces 22 and the second inclined face 24, the parallel face 26 which is approximately parallel to the optical axis O is formed in the position distant from the optical axis O. These first inclined face 22, the second inclined face 24 and the parallel face 26 are formed in a straight line manner at the cross section; however it does not necessarily have to be in a straight line, and it may be a curved face such as a projecting shape, a depressed shape or so.

In each shielding grooves 20, when the first projection length to the optical axis O of the first inclined face 22 is P1, the second projection length to the optical axis O of the parallel face 26 is P2, and the third projection length to the optical axis O of the second inclined face 24 is P3, the shielding grooves 20 satisfies the following formula (1).

$$P1+P2<P3 \quad (1)$$

By satisfying the above formula (1), even if the light entering into the lens barrel 8 from the object side enters into the shielding grooves 20, it does not contacts with the first inclined face 22 and the parallel face 26, and reflects at the second inclined face 24; and the reflected light is returned to the object side without entering to the imaging device 4 of the image side.

Note that, in the present embodiment, not all the shielding grooves 20 needs to satisfy the above formula (1), and in regards with the shielding grooves 20 formed at the position close to the second lens group 10b also does not necessarily have to satisfy the above formula (1). However, it is preferable that all of the shielding grooves 20 satisfy the above formula (1).

Also, in the present embodiment, each shielding grooves 20 are designed to satisfy the following formula (2) as well.

$$0.05<P2/(P1+P2+P3)<0.95 \quad (2)$$

By satisfying the above formula (2), while maintaining the effect to prevent, reduce or decrease the reflection in the lens barrel 8, the strength of the lens barrel 8 can be ensured, and the shape change can be suppressed by suppressing the enlargement of the outer diameter of the lens barrel 8. When it becomes below the lower limit of the formula (1), the presence ratio of the first inclined face 22 and the second inclined face 24 becomes high in each shielding grooves 20, thus the effect of preventing the reflection in the lens barrel 8 declines and it becomes difficult to ensure the strength of the lens barrel 8. When it becomes above the upper limit of the above formula (2), the presence ratio of the parallel face 26 at each shielding grooves 20 becomes high, and the chance of reflecting on the parallel face 26 becomes high thus the effect to prevent the reflection in the lens barrel 8 will decline. Note that the lower limit of the formula (2) is preferably 0.12, and further preferably 0.20. Also, the upper limit of the formula (2) is preferably 0.75, and further preferably 0.60.

In the present embodiment, the groove width of each shielding grooves 20, P0=P1+P2+P3, is not constant along the optical axis direction, and as shown in FIG. 3, when compared with the groove width P01 of the shielding groove 20$a$1 of the object side (close to the first lens group 10$a$ shown in FIG. 1), the groove width P0$n$ of the shielding groove 20$an$ of the image side (close to the second lens group 10$b$ shown in FIG. 1) is made larger intermittently or continuously. In the present embodiment, P0=0.5 to 1.5 mm. Depending on the thickness of the shielding grooves forming member or the forming means of the shielding grooves, P0 is preferably formed large within the range of larger than 0.3 mm and lower than 10 mm.

Figure 4A:
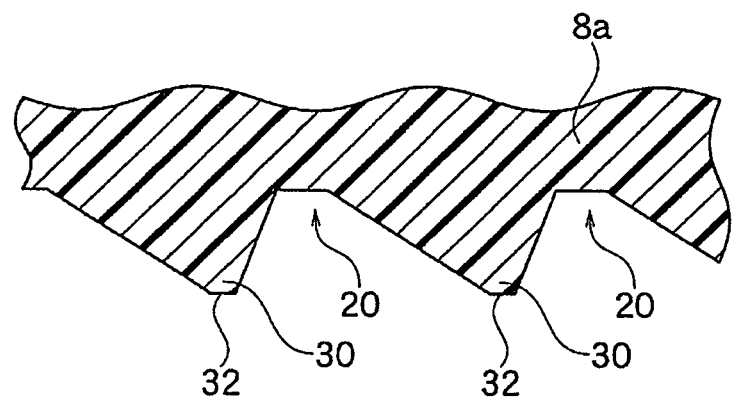
FIG. 4A is a cross section of the essential parts of the shielding grooves according to other embodiment of the present invention.
Figure 4B:
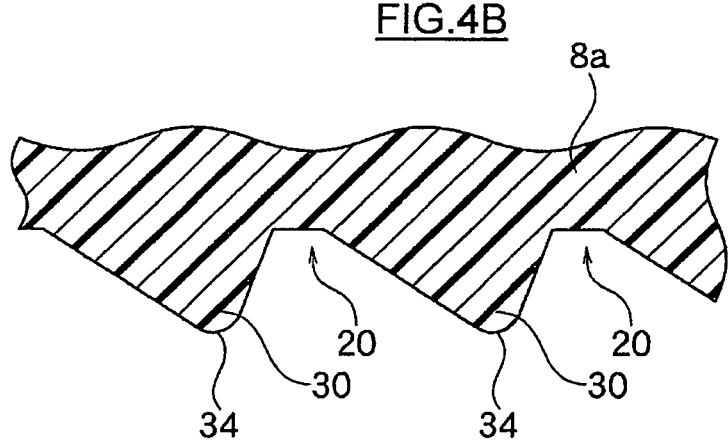
FIG. 4B is a cross section of the essential parts of the shielding grove according to further other embodiment of the present invention.

In between the adjacent shielding grooves 20 along the optical axis O, the inside projection portion 30 is formed. The peak of the inside projection portion 30 may be an acute angle; however as shown in FIG. 4A, a chamfer portion 32 may be provided, and as shown in FIG. 4B, R portion 34 may be provided. In case of providing the chamfer portion 32, the width of the chamfer thereof is preferably 0.2 mm or less. Also, in case of providing R portion 34, the curvature radius of the R thereof is preferably 0.2 mm or less.

Figure 5:
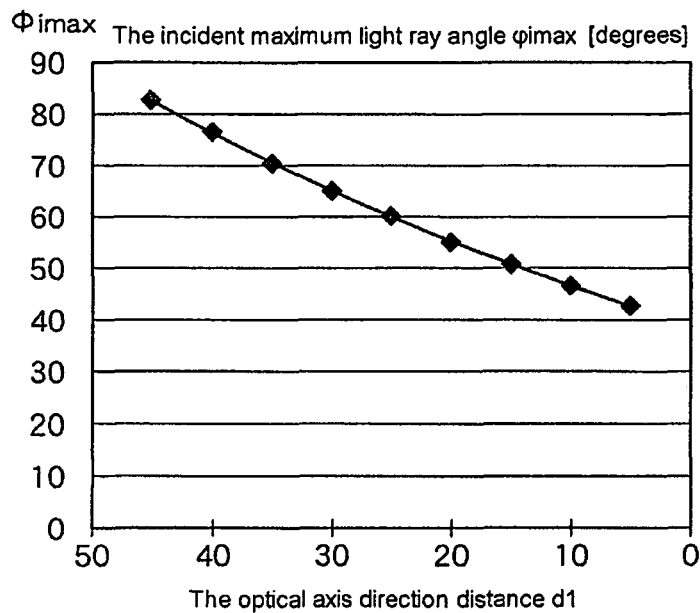
FIG. 5 is a graph showing the relation between the distance from the first lens group and the maximum light ray angle θ i max of the incident light.

As shown in FIG. 2, the first inclined angle θ1 against the optical axis O of the first inclined face 22 at each shielding grooves 20, is preferably set to the angle larger than the maximum light ray angle φ i max entering towards the shielding grooves 20 among the incident light Li entering from the tip 8$c$ of the object side of the lens barrel 8 shown in FIG. 1. The maximum angle φ i max (the incident light ray maximum angle) of the light ray entering towards the shielding grooves 20 is different depending on the distance d1 from the second lens group 10$b$, and changes significantly as shown in FIG. 5. The incident maximum light ray angle φ i max is 90 degrees angle at the most tip of the tip portion 8$c$ of the lens barrel 8 shown in FIG. 1.

As shown in FIG. 5, depending on the incident maximum light ray angle φ i max at the position corresponding to the optical axis direction distance d1 from the second lens group 10$b$, the first inclined angle θ1 of the first inclined face 22 at each shielding groove 20 is preferably changed. For example, in the present embodiment, the first inclined angle θ1 of the first inclined face 22 is set an angle larger than the incident maximum light ray angle φ i max at the position corresponding to the optical axis direction distance d1.

As shown in FIG. 2, the first inclined angle θ1 is set to a larger angle than the incident maximum light ray angle φ i max, and the light ray angle entering inside the shielding grooves 20 at the incident maximum light ray angle φ i max contacts with the second inclined face 24 and reflects there without contacting the first inclined face 22 and the parallel face 26. Also, the light ray entering inside the shielding grooves 20 at the incident minimum light ray angle φ i min contacts with the second inclined face 24 and reflects there without contacting the first inclined face 22 and the parallel face 26.

Therefore, all of the light ray going towards the shielding grooves 20 entering inside the barrel from the tip portion 8$c$ of the lens barrel 8 shown in FIG. 1 contacts with the second inclined face 24 and reflects there. The second inclined face 24 is facing the object side, thus the light ray entered to the second inclined face from the object side is returned to the object side and does not go to the direction of the imaging device 4. Therefore, the image taken by the imaging device 4 can be effectively prevented from generating the flair or ghost.

Note that, in case of forming the shielding grooves 20 at the inner wall side of the tip portion 8$c$ of the lens barrel 8 shown in FIG. 1, the first inclined angle θ1 of the inclined face 22 at the shielding grooves 20 may be set smaller than the incident maximum light ray angle φ i max at a part of the object side. In such case, the light ray entering inside of the shielding grooves 20 at the incident maximum light ray angle φ i max may have a possibility of contacting and reflecting at the parallel face 26; however the incident maximum light ray angle φ i max is close to an angle of 90 degrees angle; hence the light ray reflected at the parallel face 26 will not directly go towards the imaging device 4 and will not be a cause of the flair or the ghost. Note that, the incident maximum light ray angle φ i max at the shielding grooves 20 positioned between the second lens group 10$b$ and the first lens group 10$a$ changes not only by the distance d1 but also by the optical characteristic of the first lens group 10$a$.

As shown in FIG. 2, the second inclined angle θ2 of the second inclined face 24 at each shielding grooves 20 is determined as follows. The second inclined angle θ2 is equal or larger than the maximum angle φ o max of the outgoing light (the outgoing maximum light ray angle) outgoing toward the imaging device 4 shown in FIG. 1 from the shielding grooves 20, and furthermore it is set to be smaller than the first inclined angle θ1. Preferably, the second inclined angle θ2 is a value close to the outgoing maximum light ray angle φ o max, and it is preferably larger by 0 to 20 degrees angle compared to the outgoing maximum light ray angle φ o max.

Note that, the outgoing maximum light ray angle φ o max from the shielding grooves 20 and the outgoing minimum light ray angle φ o min are determined as follows. That is, as shown in FIG. 1, the light ray Lo outgoing towards the imaging device 4 from each shielding grooves 20 is hypothetically set, and among the light ray outgoing to the imaging range of the imaging device 4, the angle against the optical axis O of the light ray outgoing in a maximum angle is defined as the outgoing maximum light ray angle φ o max.

Also, the light ray Lo outgoing towards the imaging device 4 from each shielding grooves 20 is hypothetically set, and among the light ray outgoing to the imaging range of the imaging device 4, the angle against the optical axis O of the light ray outgoing in a minimum angle is defined as the outgoing minimum light ray angle φ o min. The outgoing maximum light ray angle φ o max and the outgoing minimum light ray angle φ o min are determined in accordance with the optical characteristics of the second lens group 10$b$ and other lens group 10$c$.

Figure 6:
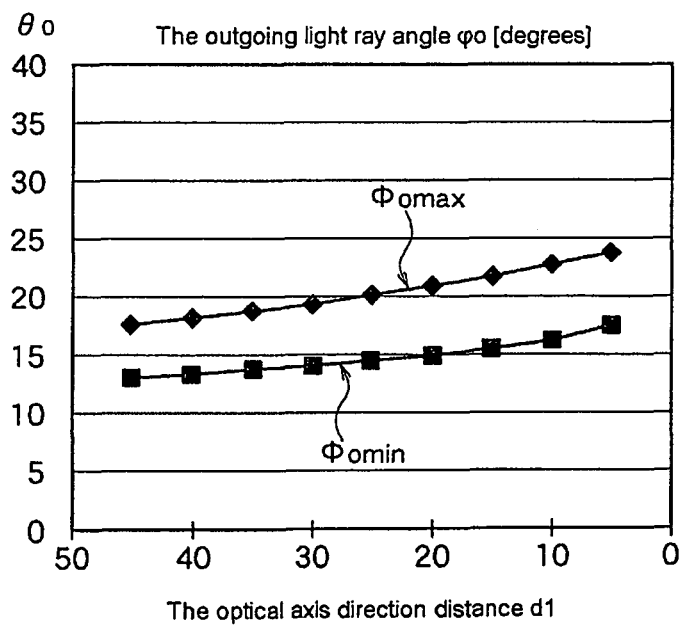
FIG. 6 is a graph show the relation between the maximum light ray angle θ O max and the minimum θ O min of an outgoing light to the imaging device and the distance from the first lens group.

Also, these outgoing maximum light ray angle φ o max and the outgoing minimum light ray angle φ o min changes depending on the distance d1 along the optical axis O direction towards the second lens group 10$b$ and the first lens group 10$a$, as shown in FIG. 6. Note that, the change of the outgoing maximum light ray angle φ o max and the outgoing minimum light ray angle φ o min with respect to the distance d1 is smaller than the change of the incident maximum light ray angle φ i max, which is obvious by comparing FIG. 5 and FIG. 6.

In the present embodiment, at each shielding grooves 20 positioned in between the second lens group 10$b$ and the first lens group 10$a$, the second inclined angle θ2 of the second inclined face 24 is preferably changed along the optical axis O direction based on the outgoing maximum light ray angle φ o max shown in FIG. 6 and becomes larger near the second lens group 10$b$; however it may be constant. For example, the second inclined angle θ2 of the second inclined face 24 is determined as described in the above, based on the outgoing maximum light ray angle φ o max (about 25 degrees angle in FIG. 6) at the position where the distance d1 shown in FIG. 6 is close to 0.

In the present embodiment, as shown in FIG. 3, compared to the first inclined angle θ1 of the first inclined face 22 of the shielding groove 20$a$1 of the object side (near the first lens group 10$a$ shown in FIG. 1), the first inclined angle θ1 of the shielding grooves 20$an$ of the image side (near the second lens group 10$b$ shown in FIG. 1) is made small continuously or intermittently depending on the changing rate of the incident maximum light ray angle φ i max shown in FIG. 5.

As a result, compared to the first projection length P11 of the shielding groove 20$a$1 of the object side (near the first lens group 10$a$ shown in FIG. 1), the first projection length P1$n$ of the shielding groove 20$an$ of the image side (near the second lens group 10$b$ shown in FIG. 1) is made large continuously or intermittently depending on the changing rate of the incident maximum light ray angle φ i max shown in FIG. 5.

Also, as shown in FIG. 3, the second inclined angle θ2 of the second inclined face 24 is determined based on the outgoing maximum light ray angle φ o max shown in FIG. 6, and it does not change along the optical axis O direction. Therefore, the third projection lengths P31 to P3$n$ are constant along the optical axis direction. Also, the second projection lengths P21 to P2$n$ does not need to be barely changed along the optical axis O direction. Thus, according to the above, the groove widths P01 to P0$n$ of each shielding grooves 20$a$1 to 20$an$ becomes larger continuously or intermittently as getting closer to the second lens group 10$b$ along the optical axis O.

Note that, the third projection lengths P31 to P3$n$ may be become slightly short as getting close to the second lens group 10$b$ following the change of the outgoing maximum light ray angle φ o max shown in FIG. 6; however it is small compared to the change of the first projection lengths P11 to P1$n$. Therefore, there is no change in the fact that the groove widths P01 to P0$n$ of each shielding grooves 20$a$1 to 20$an$ becomes larger continuously or intermittently as getting closer to the second lens group 10$b$ along the optical axis O.

As shown in FIG. 1, in the camera 2 having the lens barrel 8 of the present embodiment, at the longitudinal cross section including the optical axis O of the second lens group 10$b$ of the inner wall face of the first tube portion 8$a$, the plurality of shielding grooves 20 having a blade saw shape are formed along the optical axis O. Thereby, the effect to prevent, reduce or decrease the reflection in the lens barrel 8 can be carried out. Thus, the flair or ghost are prevented from being generated in the image taken by the imaging device 4, hence the quality of the image is improved.

Also, in this lens barrel 8, each shielding grooves 20 is constituted from the first inclined face 22, the second inclined face 24, and the parallel face 26; and in each shielding grooves 20, the parallel face 26 is placed furthest from the optical axis O. Compared to the shielding grooves without the parallel face 26, at the shielding grooves 20 of the present embodiment with the parallel face 26, the depth of the shielding grooves 20 can be set shallower, thus the outer diameter of the lens barrel 8 is suppressed from being large, and it becomes possible to ensure the strength of the lens barrel 8 and the shape change.

Further, by forming the parallel face 26 at each shielding grooves 20, the number of the peak of the projection portion 30 formed between the shielding grooves 20 adjacent to each other in the optical axis direction can be reduced along the optical direction. As the peak of the projection portion 30 formed between the shielding grooves 20, the less the number of the peaks thereof is, the more preferable it is, so that it can be a point where the light reflects when entering into the lens barrel 8 in the inner circumference face of the lens barrel 8. Note that, by controlling the angle between the first inclined face 22 and the second inclined face 24, even when the light entering into the lens barrel from the object side enters inside the shielding grooves 20, it does not contact each parallel face 26 and is reflected by the second inclined face 24, thereby it returns to the object side.

Also, in the present embodiment, as shown in FIG. 3, the ratio of (P1+P2)/P3 in each shielding grooves 20$a$1 to 20$an$ is made to change in steps or gradually along the optical axis direction. For example, the ratio of (P1+P2)/P3 in each shielding grooves 20$a$1 to 20$an$ are made to change in steps or gradually along the optical axis direction so that the ratio of (P1$n$+P2$n$)/P3$n$ at the shielding groove 20$an$ positioned near the second lens group 10$b$ becomes larger compared to the ratio of (P11+P21)/P31 at the shielding groove 20$a$1 positioned near the first lens group 10$a$ shown in FIG. 1.

As shown in FIG. 5, the incident maximum light ray angle φ i max can be small as the distance d1 becomes close to 0; that is as the shielding grooves 20 becomes close to the second lens group 10$b$. Therefore, the first inclined angle θ1 determined based on the incident maximum light ray angle φ i max can be made small as the shielding grooves 20 becomes close to the second lens group 10$b$; and as a result, even when the first projection length P1 is made long such that it becomes close to the second lens group 10$b$, the reflection prevention effect can be expected.

Also, as shown in FIG. 6, the outgoing maximum light ray angle φ o max barely changes regardless of the distance d1. The second inclined angle θ2 determined based on the outgoing maximum light ray angle φ o max can be set constant regardless of the distance d1; thus as a result, even when the third projection length P31 of the shielding groove 20$a$1 near the first lens group 10$a$ is made approximately same as the third projection length P3$n$ of the shielding groove 20$an$ near the second lens group 10$b$, the effect of the reflection prevention can be expected. Also, the second projection length P21 to P2$n$ can be made constant regardless of the distance d1.

Figure 7:
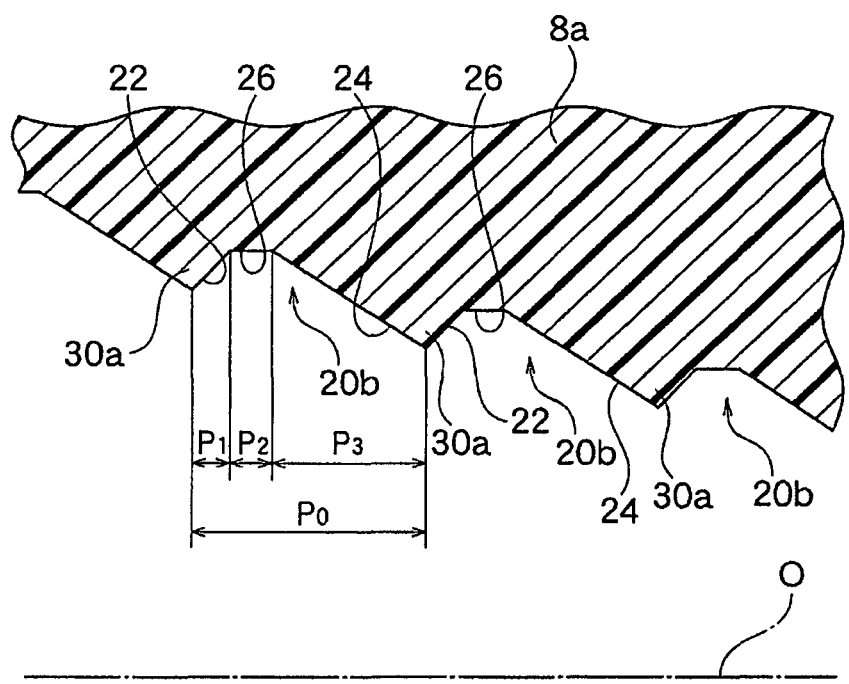
FIG. 7 is a cross section of the essential parts of the shielding grooves according to further other embodiment of the present invention.

Therefore, as shown in FIG. 7, the first projection length P0$n$ at the shielding groove 20$an$ can be larger compared to the first projection length P01 at the shielding groove 20$a$1. As a result, the ratio of (P1+P2)/P3 and the groove width P01 to P0$n$ of the shielding grooves 20$a$1 to 20$an$ are made to become larger in steps or gradually along the optical axis direction.

By allowing the groove width P01 to P0$n$ of the shielding grooves 20$a$1 to 20$an$ which interferes the reflection light from going towards the imaging device 4 to become large, the number of the inner projection portion 30 along the optical axis O can be reduced, and the reflection at the inner projection portion 30 is reduced, thus the reflection prevention effect becomes further effective.

Note that, in the present embodiment, as shown in FIG. 3, the inner diameter of plurality of the inner projection portion 30 formed along the optical axis O direction are constant along the optical axis O direction; however it may be constituted so that the inner diameter of the inner projection portion 30a becomes smaller towards the image side, as shown in FIG. 7. Note that, other constitution and effects are same as the above mentioned embodiment including the relation among the first inclined face 22, the parallel face 26 and the second inclined face 24 at each shielding groove 20b.

Also, in the above mentioned embodiment, the parallel face 26 was provided to each shielding grooves 20; however the parallel face 26 may be omitted particularly in regards with a part of or at all of the shielding grooves 20 near to the second lens group 10b.

Figure 8:
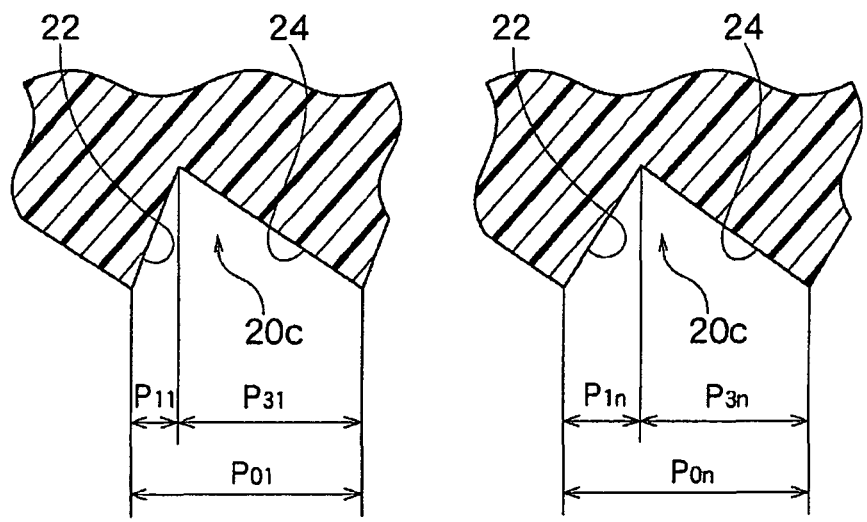
FIG. 8 is a cross section of the essential parts of the shielding grooves according to further other embodiment of the present invention.

For example, as shown in FIG. 8, in regards with each shielding groove 20c, it may be constituted only by the first inclined face 22 and the second inclined face 24. Also, compared to the first projection length P11 of the shielding groove 20c of the object side (near the first lens group 10a shown in FIG. 1), the first projection length P1n of the shielding groove 20c of the image side (near the second lens group 10b shown in FIG. 1) may be made to become intermittently or continuously large in accordance with the changing rate of the incident maximum light ray angle φi max shown in FIG. 5.

In regards with the third projection length P31 to P3n shown in FIG. 8, it may be constant; however it may be made slightly shorter as it becomes closer to the second lens group 10b in accordance with the change of the outgoing maximum light ray angle φo max as shown in FIG. 6. Note that, the changing rate of the third projection length P31 to P3n is small compared to the changing rate of the first projection length P11 to P1n. Therefore, the groove width P01 to P0n of each shielding groove 20c becomes large in steps or continuously as it becomes closer to the second lens group 10b along the optical axis O. Other constitutions and effects are the same as the above mentioned embodiment.

In the embodiment mentioned in the above, the still camera was described; however the constitution of the above mentioned embodiment can be applied to the lens barrel of the video camera as well.

Figure 9:
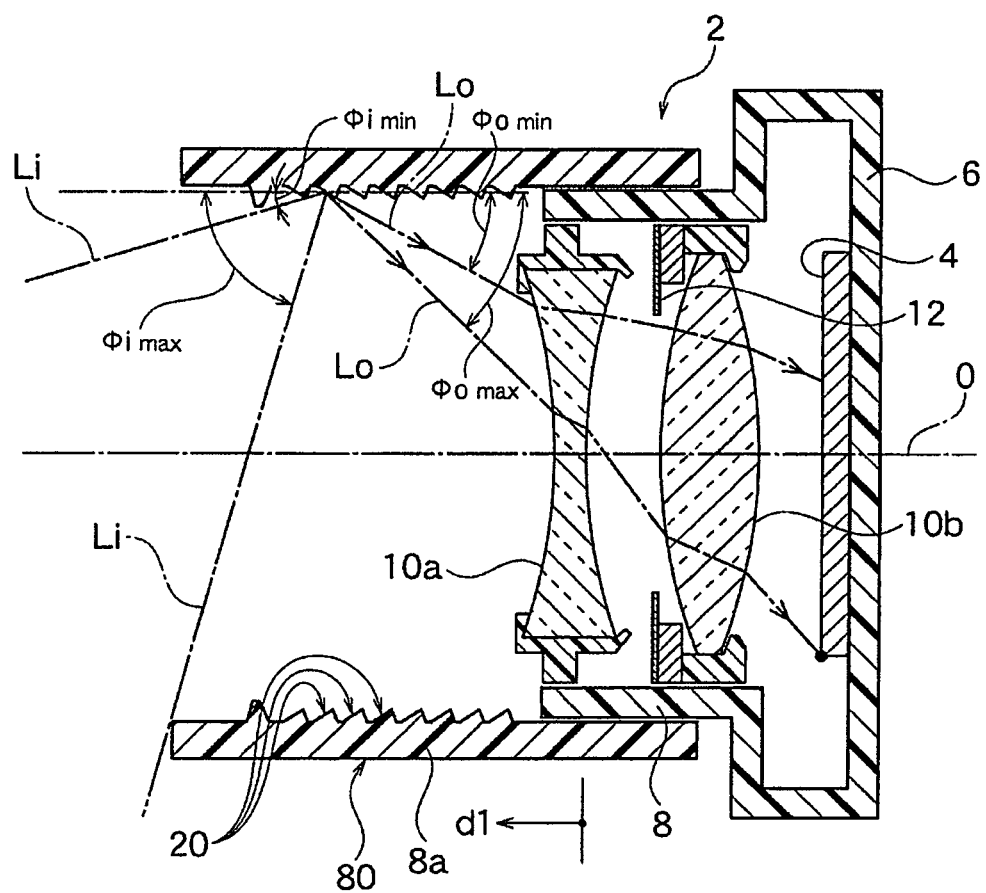
FIG. 9 is a schematic cross section of the camera with the hood according to the further other embodiment of the present invention.

Also, in the above mentioned embodiment, the example formed with the shielding grooves 20 at the inner circumference face of the lens barrel were explained; however as shown in FIG. 9, the shielding grooves 20 as same as the above mentioned embodiment can be formed at the inner circumference face of the hood 80 mountable to the lens barrel 8 comprising the first lens group 10a and the second lens group 10b. That is, in the shielding grooves 20 shown in FIG. 9, the structure shown in FIG. 2 to FIG. 8 can be used, and also the relation shown in FIG. 5 and FIG. 6 can be obtained. Note that, in the camera 2 shown in FIG. 9, the first lens group 10a from the object side is a concave lens, and the second lens group 10b is the convex lens; however it is not limited thereto.

The invention claimed is:

1. A lens barrel comprising a first tube portion in which at least part of said first tube portion is placed at an object side of a lens group, wherein
at an inner wall face of said first tube portion, a plurality of shielding grooves having a saw blade shape are formed along an optical axis direction at a longitudinal cross section including the optical axis of said lens group,
pitch spaces of the plurality of said shielding grooves along said optical axis are formed so that said pitch spaces change as they get closer to said lens group from said object side,
wherein a shielding groove of the plurality of shielding grooves comprises at least a first inclined face facing an image side and a second inclined face facing the object side, and
at least part of said shielding groove further comprises a parallel face approximately parallel to the optical axis and formed between said first inclined face and said second inclined face.

2. The lens barrel as set forth in claim 1, wherein said pitch spaces of the plurality of shielding grooves along said optical axis direction are formed so that said pitch spaces become continuously wider as they get closer to said lens group from said object side.

3. The lens barrel as set forth in claim 2, wherein an object side lens group is provided at the object side of said lens group, and
the plurality of said shielding grooves formed along said optical axis at the inner wall face of said first tube portion are positioned between said lens group and said object side lens group.

4. A camera device comprising the lens barrel as set forth in claim 2.

5. The lens barrel as set forth in claim 1, wherein in said shielding groove, when a first projection length towards said optical axis of said first inclined face is P1, a second projection length towards said optical axis of said flat face is P2, and a third projection length to said optical axis of said second inclined face is P3, then following formula (1) is satisfied:

$$P1+P2<P3 \quad (1).$$

6. The lens barrel as set forth in claim 5, wherein said lens barrel further satisfies the following formula (2):

$$0.05<P2/(P1+P2+P3)<0.95 \quad (2).$$

7. The lens barrel as set forth in claim 1, wherein an angle of said first inclined face against said optical axis direction is larger at a shielding groove further away from said lens group towards said object side, when compared with a shielding groove closer to said lens group.

8. The lens barrel as set forth in claim 1, wherein an angle of said second inclined face against said optical axis is smaller at a shielding groove further away from said lens group towards said object side, when compared with a shielding groove closer to said lens group.

9. The lens barrel as set forth in claim 1 wherein an object side lens group is provided at the object side of said lens group, and
the plurality of said shielding grooves formed along said optical axis at the inner wall face of said first tube portion are positioned between said lens group and said object side lens group.

10. The lens barrel as set forth in claim 9 wherein said object side lens group has a positive refractive index, and said lens group has a negative refractive index.

11. The lens barrel as set forth in claim 9 wherein an air space along said optical axis between said lens group and said object side lens group is constituted in a changeable manner.

12. An camera device comprising the lens barrel as set forth in claim 1.

13. A hood mountable at the object side of a lens barrel, wherein
a plurality of shielding grooves having a saw blade shape are formed along an optical axis at a longitudinal cross section including said optical axis of said lens barrel at the inner wall face of said hood, pitch spaces of the plurality of said shielding grooves along said optical axis are formed so that said pitch spaces change as they get closer to the image side from the object side, wherein a shielding groove of the plurality of shielding grooves comprises at least a first inclined face facing an image side and a second inclined face facing the object side, and at least part of said shielding groove further comprises a parallel face approximately parallel to the optical axis and formed between said first inclined face and said second inclined face.

14. The hood as set forth in claim 13 wherein said pitch spaces of the plurality of shielding grooves along said optical axis are formed to be continuously wider as they get closer to the image side from the object side.

* * * * *